United States Patent
Patino et al.

(10) Patent No.: US 7,932,702 B1
(45) Date of Patent: Apr. 26, 2011

(54) METHOD AND APPARATUS FOR CHARGING A BATTERY TO AN ENHANCED CAPACITY

(75) Inventors: Joseph Patino, Pembroke Pines, FL (US); Andrew F. Burton, Tamarac, FL (US)

(73) Assignee: Motorola Mobility, Inc., Libertyville, IL (US)

( * ) Notice: Subject to any disclaimer, the term of this patent is extended or adjusted under 35 U.S.C. 154(b) by 389 days.

(21) Appl. No.: 11/553,559

(22) Filed: Oct. 27, 2006

(51) Int. Cl.
*H02J 7/00* (2006.01)
(52) U.S. Cl. .......................... 320/160; 320/134; 320/157
(58) Field of Classification Search .................. 320/130, 320/134, 145, 157, 160, 162
See application file for complete search history.

(56) References Cited

U.S. PATENT DOCUMENTS

| | | | |
|---|---|---|---|
| 5,576,612 A | 11/1996 | Garrett et al. | |
| 5,710,506 A * | 1/1998 | Broell et al. | 320/145 |
| 5,986,433 A | 11/1999 | Peele et al. | |
| 6,020,720 A | 2/2000 | Corbridge | |
| 6,127,804 A | 10/2000 | Oglesbee et al. | |
| 6,184,651 B1 * | 2/2001 | Fernandez et al. | 320/108 |
| 6,489,751 B2 | 12/2002 | Small et al. | |
| 6,707,272 B1 | 3/2004 | Thandiwe | |
| 7,282,891 B2 * | 10/2007 | Smallwood et al. | 320/137 |
| 2005/0024061 A1 * | 2/2005 | Cox et al. | 324/426 |
| 2008/0007202 A1 * | 1/2008 | Pryor | 320/104 |

* cited by examiner

*Primary Examiner* — Edward Tso
*Assistant Examiner* — Aaron Piggush

(57) ABSTRACT

A lithium-ion battery (126) is normally charged using a constant current/constant voltage charge regime (206, 210), where the battery is charged to a preselected normal voltage level (210) whereupon the voltage is maintained at the limit while the charging current diminishes. The battery charge capacity can be selectively increased by charging the battery to an enhanced voltage level (212). The enhanced charging mode is selected by a user via a device user interface (112), or alternatively by a broadcast command (304) transmitted to the device.

13 Claims, 4 Drawing Sheets

METHOD AND APPARATUS FOR CHARGING A BATTERY TO AN ENHANCED CAPACITY

TECHNICAL FIELD

This invention relates in general to portable battery powered devices and more particularly to methods of charging batteries for use with such devices.

BACKGROUND OF THE INVENTION

There are a variety of portable electronic devices in common use by many people for a number of different tasks. Not the least of which is the cellular or radio telephone and other mobile communication devices. These devices are all battery powered, and because of their relatively high power consumption they typically employ rechargeable batteries due to the high operating cost that would be incurred with primary batteries.

Rechargeable batteries are typically recharged according to a charge regime, meaning prescribed voltage and/or current levels and limits are applied to the battery, and other factors such as change in voltage, current, temperature, or a combination of these, may be taken into account to determine when the battery is finished charging. For example, nickel-based batteries are often monitored for temperature and voltage changes. Lithium-ion batteries are typically charged using a constant current to constant voltage regime, where the voltage level during the constant voltage phase is carefully controlled.

In charging lithium-ion batteries, it has been found that the voltage level used during the constant voltage phase affects cycle life of the battery. The higher the voltage limit used, the more the cycle life of the battery is reduced. Since manufactures often warranty battery cycle life, the charge voltage limit as carefully selected to balance optimum charge capacity with cycle life of the battery. However, at the expense of cycle life, a lithium ion battery may be recharged to a capacity higher than its nominal capacity by setting the charge limit voltage higher than a standard or normal level. Since battery cycle life is warranted, though, chargers and charge controllers for lithium-ion batteries are designed with a fixed charge voltage limit. In some situations, however, users may wish to achieve higher capacity at the sake of cycle life, and possibly altering or voiding a battery warranty. Therefore there is a need for battery charger that allows selectivity in recharging a lithium-ion battery with regard to charge voltage limit.

DETAILED DESCRIPTION

Figure 1:
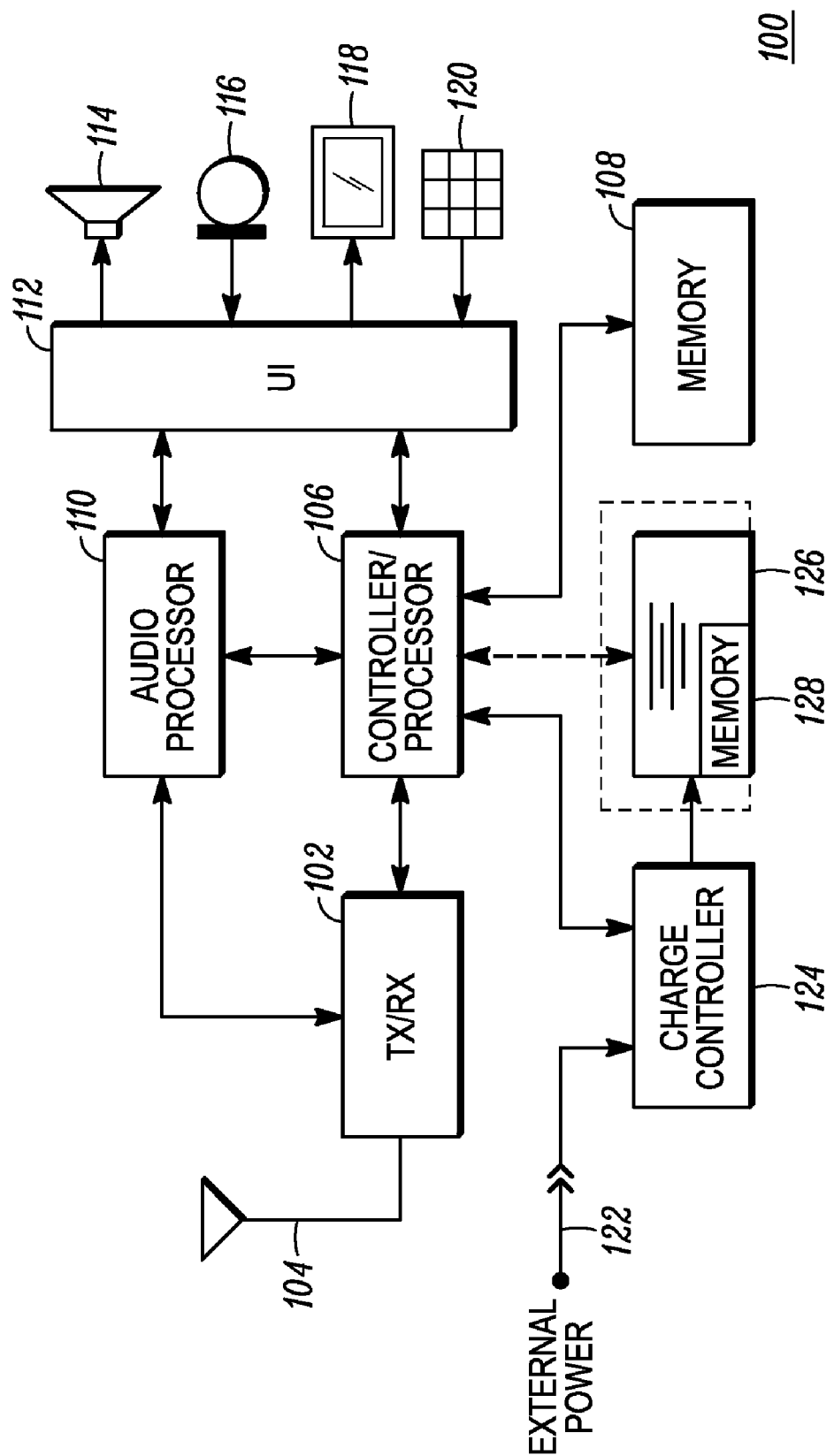
FIG. 1 shows a block schematic diagram of a portable device system, in accordance an embodiment of the invention.

While the specification concludes with claims defining the features of the invention that are regarded as novel, it is believed that the invention will be better understood from a consideration of the following description in conjunction with the drawing figures, in which like reference numerals are carried forward.

The invention solves the problem of under-utilizing battery capacity for the sake of cycle life by allowing the battery to be charged using an enhanced capacity charge regime. The battery is initially charged normally, using a constant current applied to a lithium ion battery or battery cell. The constant current portion of the charge regime conventionally lasts until the battery voltage reaches a preselected voltage limit $V_n$, at which time a charge controller determines if the enhanced mode is enabled. If the enhanced mode is enable, the constant current charging continues until an enhanced voltage limit $V_l$ is reached. The enhanced voltage limit being higher than the normal voltage limit. Once the appropriate voltage limit is reached for the present charging mode, the charging regime changes from a constant current to a substantially constant voltage regime, maintaining the battery voltage at either the normal voltage limit of the enhanced voltage limit. Alternatively, in the enhanced mode, upon the battery voltage reaching the enhanced voltage limit, the charging may continue using a constant voltage regime at the normal voltage limit. When the enhanced mode is used, and if the battery or battery pack contains a memory, the charge controller may indicate that the enhanced mode was used in the battery memory for warranty purposes.

Referring now to FIG. 1, there is shown a block schematic diagram of a portable device system 100, in accordance an embodiment of the invention. The portable device may be any portable electric or electronic device that is powered by a rechargeable battery. In the present example, the portable device is a mobile communication device, such as, for example, a cellular telephone. The mobile communication device comprises a communications transceiver 102 for transmitting and receiving communication signals in conjunction with an antenna 104. At the level of abstraction used here, the transceiver may include signal processing elements, modulation elements, and so on. The mobile communication device further comprises a controller or processor 106 which supervises operation of the mobile communication device and its various subsystems in accordance with instruction code stored in a memory 108, as is well practiced. The mobile communication device may also contain an audio processor 110 for processing audio information. The audio processor receives digital audio signals from the transceiver 102, and converts them into analog audio signals to be played over an audio transducer or speaker 114 as part of an overall user interface 112. The audio processor may also synthesize sounds to be played from audio files stored in the memory 108. The audio transducer may be an earpiece speaker or other audio device for generating sound. Similarly, the audio processor receives audio signals from a microphone 116 and coverts the received analog audio signal to a digital audio signal for transmission by the transceiver 102. The user interface 112 as shown here is simply an abstraction of hardware and software elements allowing user interaction with the device, including, for example, drivers, filters, switches, and so on. The user interface further supports a display 118 and a keypad and other buttons 120. The display is used to present graphical information in a visually perceptible format, while the keypad allows the user to input information, select options, and otherwise operate the device.

The device may be adapted to receive electrical power from an external source 122. The external power is used by a charge controller 124 to recharge a battery 126 used to power the device when the external power supply is not present or connected to the device. The charge controller controls the application of electric current and voltage to the battery according to a charge regime, and determines when to commence charging, when to cease charging, perform maintenance charging, and other charging-related functions. In the case of a lithium ion battery, the charge controller typically applies first a constant current charge regime until the battery voltage reaches a preselected voltage limit. Upon reaching the voltage limit, the charge controller maintain the battery voltage at the voltage limit, allowing the current to diminish as the battery continues to recharge.

According to an embodiment of the invention, the charge controller is capable of charging the battery to either a normal charge capacity, or an enhanced capacity. The enhanced capacity charging mode may be selected by, for example, the user via the user interface, or it may be selected via a control command received over the air, or both. Assuming a discharged lithium ion battery, upon connection to the external power supply, the charge controller first applies a constant or substantially constant current to the battery. The charge current is typically of an amperage corresponding to the rated capacity of the battery. So, if for example the battery has a rated 1000 milliamp-hour capacity, the initial charge current would typically be 1000 milliamperes. The constant current charge regime continues until the battery voltage reaches a normal voltage limit, which is a preselected limit to allow the battery to reach its rated capacity of recharge. Upon reaching the normal voltage limit, however, according to the invention, the charge controller checks to see if the enhanced charging mode has been selected. Determining if the enhanced charging mode has been selected may be performed by, among other means, querying the controller 106, checking a system flag in memory, checking a flag in the charge controller 124 set by the controller 106, checking a bit field in a battery memory 128 in the battery that may be adjusted by the controller 106, and so on. If the enhanced charging mode is selected or otherwise indicated, the charge controller continues to apply the constant charging current, allowing the battery voltage to exceed the normal battery voltage limit, until the battery voltage reaches an enhanced voltage limit. Once the battery voltage reaches the enhanced voltage limit, the charge controller may maintain the battery voltage at the enhanced voltage limit, allowing the charge current to diminish as the battery charge continues to increase.

Alternatively, once the battery voltage reaches the enhanced limit, the charge controller may drop the charge current such that the battery voltage drops to the normal charge voltage limit, and continue charging with a constant voltage charge regime at the normal charge voltage limit. By allowing the battery voltage to reach the enhanced level, and then continuing to charge at the normal charge voltage limit rather than at the enhanced voltage limit, the battery will be recharged faster than it would using the normal charge mode, but will not attain a substantially increased charge capacity as when the battery voltage is maintained at the enhanced charge voltage limit. Thus, either increased capacity, or decreased charging time may be selected as an enhanced charging mode.

Since charging the battery using the enhanced charging mode reduces the battery's cycle life (the number of charge-discharge cycles), use of the enhanced charging mode could exceed the warranty conditions of the battery. Manufacturers would therefore want to know how often or how many times a battery had been subjected to the enhanced charging mode in determining whether a given warranty return battery is indeed faulty or not. Therefore, according to an embodiment of the invention, the battery may contain a battery memory 128 in which to store various information, including, for example, the number of times the battery has been charged using the enhanced charging mode. A bit field in a designated memory location in the battery memory may be used to keep a count of the number of times the battery has been charged using the enhanced charging mode, and the charge controller 124 may maintain or increment the count whenever the enhanced charging mode is enabled, and the battery voltage actually exceeds the normal battery voltage limit. By not incrementing the count unless the battery voltage exceeds the normal battery voltage limit, even if the enhanced charging mode is enabled, such as may occur if the external power supply is disconnected before the battery voltage reaches the normal charge voltage limit, the owner of the battery is not penalized with an increased count.

Figure 2:
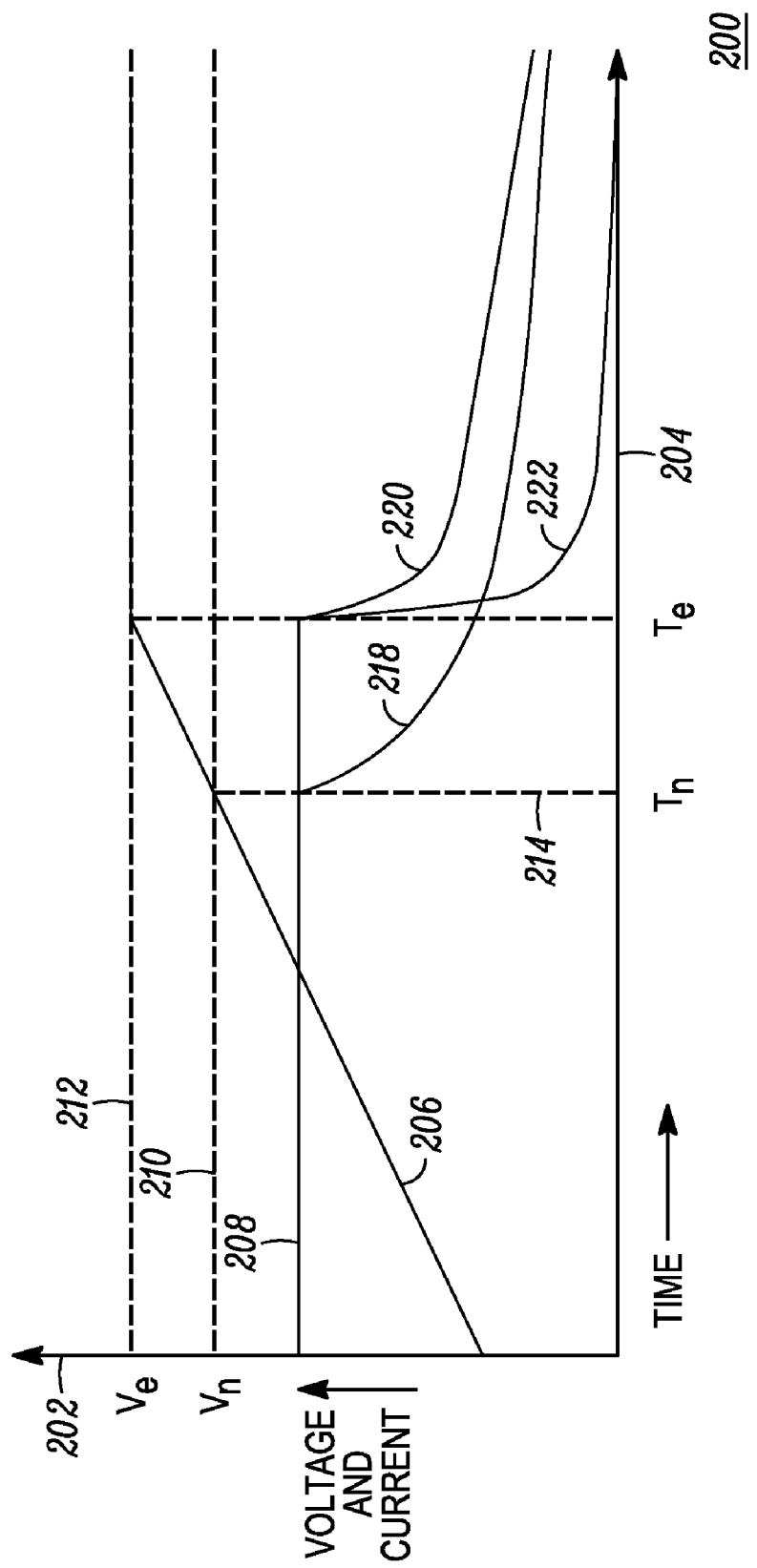
FIG. 2 shows a charging diagram of voltage and current verses time for a normal charge mode and an enhanced charge mode, in accordance with an embodiment of the invention.

Referring now to FIG. 2, there is shown a charging diagram 200 of voltage and current verses time for a normal charge mode and an enhanced charge mode, in accordance with an embodiment of the invention. The vertical axis 202 indicates voltage and current magnitude, generally. The horizontal axis 204 indicates charging time. The voltage line 206 indicates the battery voltage while the battery is charging, while the current line 208 indicates the charging current as the battery is charged. The battery is first charged using a constant current regime until the battery voltage reaches the normal charge voltage limit 210 at a first time $T_n$ 214. If the enhanced charging mode is not enabled, the battery voltage is maintained at the normal charge voltage limit, and the charge current will diminish as indicated by curve charge current 218. If the enhanced charge mode is enabled, however, the charge current continues at the constant current regime level until the battery voltage reaches the enhanced voltage limit 212 at a subsequent time $T_l$. The charging may continue by maintaining the battery voltage at the enhanced charge voltage limit, and the charge current falls away much faster, as indicated by charge current curve 220. Using the enhanced charging mode, the battery is recharged to a higher capacity in less time than that resulting from charging using the normal charging mode. Alternatively, if after the battery voltage reaches the enhanced charge voltage limit, and the charging is continued at the normal charge voltage limit, the current will follow curve similar to charge current curve 222. In that case, the capacity is not substantially enhanced, but the charge time is reduced.

Figure 3:
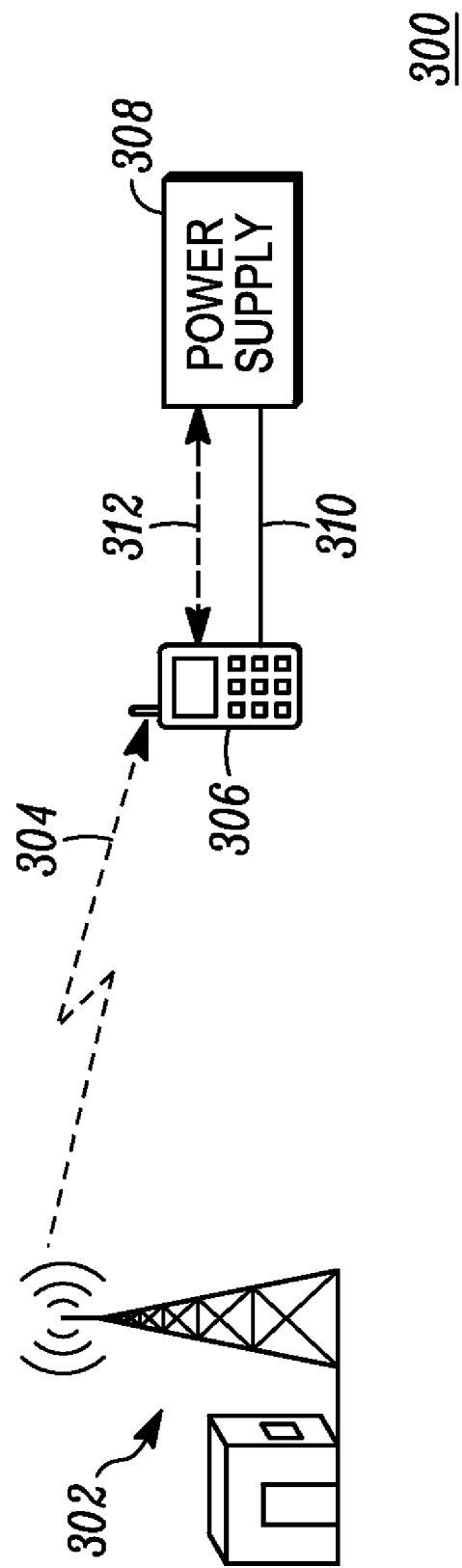
FIG. 3 shows a communication system for enabling an enhanced charging mode in a mobile communication device, in accordance with an embodiment of the invention.

Referring now to FIG. 3, there is shown a communication system 300 for enabling an enhanced charging mode in a mobile communication device, in accordance with an embodiment of the invention. The communication system 300 includes a base station 302. The base station includes an antenna for transmitting signals to mobile communication devices in the vicinity of the base station. The geographic region serviced by the base station is known as a serving area or cell. The base station may further receive signals from devices located within its serving area. According to a present embodiment of the invention, the base station is used to broadcast an enhanced charging mode command 304 to mobile communication devices in the serving area such as mobile communication device 306. The broadcast command may be broadcast to specific, addressable or otherwise select call receivers or mobile communication devices, such as those used by emergency services personnel. The broadcast command causes all designated devices receiving the command to recharge their associated battery using the enhanced charging mode for increased battery capacity. The command may be issued upon the occurrence of an emergency situation. Upon connecting the device 306 to a power supply 308, electric power will be supplied to the device over a power link 310. The electric power is used to both power the device and charge the battery of the device. The device may have an integral charge controller, as shown in FIG. 1, or the external power supply may contain the charge control function, and the device then indicates enablement of the enhanced charging mode over a communication link 312. The communication link may simply read a bit field in the battery memory that has been adjusted by the device to indicate enablement of the enhanced mode.

Figure 4:
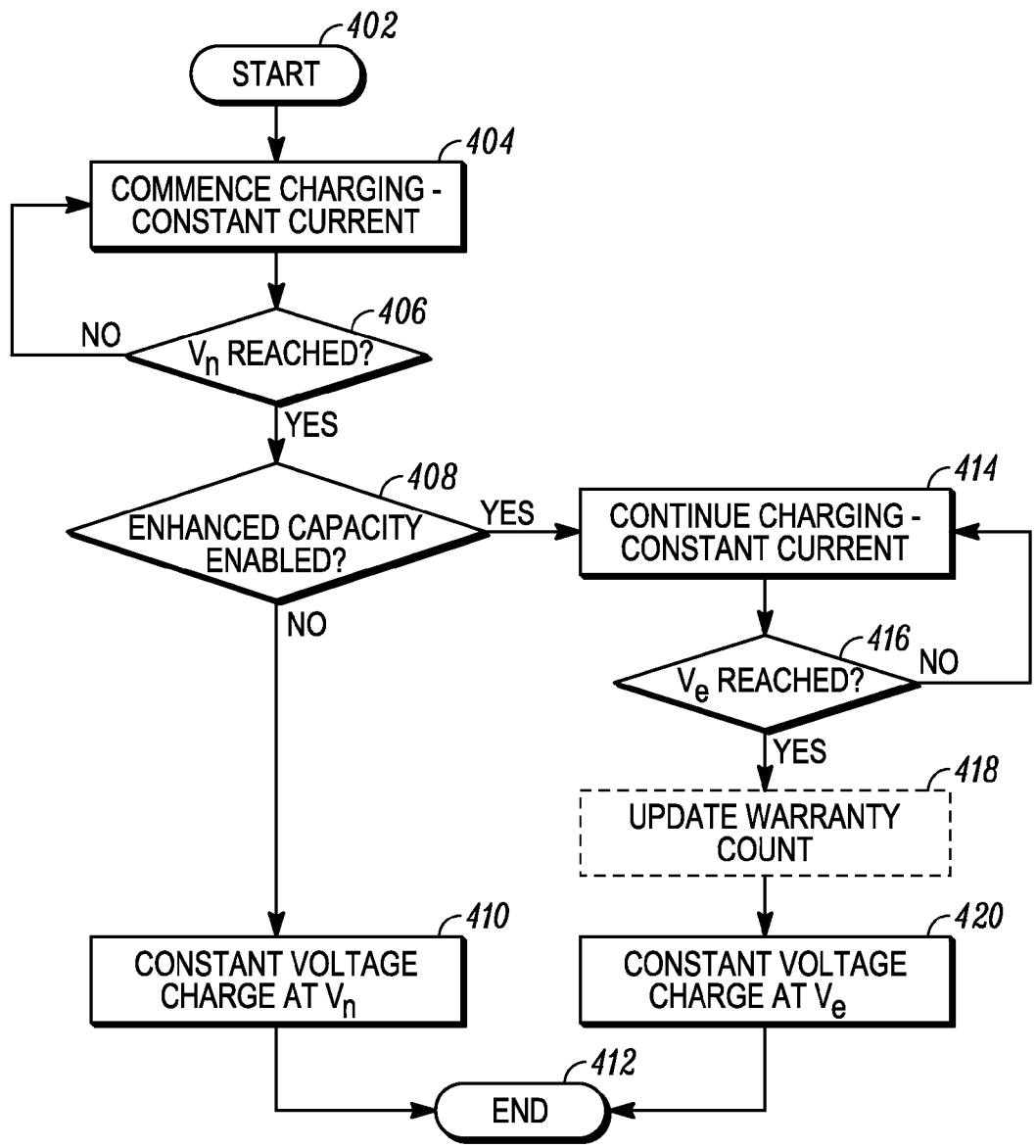
FIG. 4 shows a flow chart diagram of a method of charging a battery coupled to a portable device, in accordance with an embodiment of the invention.

Referring now to FIG. 4, there is shown a flow chart diagram 400 of a method of charging a lithium ion battery to achieve an enhanced capacity, in accordance with an embodiment of the invention. At the start 402 of the method, the battery is coupled to a charging entity, such as an external charger, or a charge controller in a portable device to which the battery is coupled. According to the present embodiment, the charging entity commences charging of the battery (404) by application of a constant or substantially constant current. While the constant current is applied to the battery, the charging entity observes or sampled the battery voltage to determine if the battery voltage has reached a nominal or normal voltage limit (406). Once the normal charging voltage limit is reached, the charging entity determines if the enhanced mode is enabled (408). Alternatively, the determination of whether the enhanced mode is enabled may be made before the battery voltage reaches the normal charge limit, even prior to commencement of charging. If, upon the battery voltage reaching the normal charging voltage limit, the enhanced mode is not enabled, the charging entity changes to a constant voltage charge regime (410), and the charging continues normally until the battery is fully recharged (412) to its normal capacity.

However, if upon the battery voltage reaching the normal charge voltage limit, the charging entity has determined that the enhanced charging mode is enabled, the charging entity continues applying the constant current charge regime, allowing the battery voltage to exceed and continue rising above the normal charge voltage limit (414). While continuing to apply the constant current charge regime, then, the charging entity checks to see if the battery voltage has reached an enhanced charging voltage limit (416). Once the enhanced voltage limit is reached, the charging entity commences a constant voltage charge regime holding the battery voltage at the enhanced voltage limit (420). The charging entity may update warranty information in a battery memory (418), either after the battery voltage has reached the enhanced voltage limit, or after the battery voltage exceeds the normal voltage limit, such as before box 414. While the constant voltage charge regime is applied, the current diminishes until the battery is fully charged (412). The battery is considered fully recharged when the charging current decreases to a predefined level while maintaining the charging voltage at the selected level.

Thus, the invention provides in one embodiment a method of charging a lithium ion battery to provide enhanced capacity. The enhanced capacity resulting in greater energy storage compared to a normal capacity of the battery obtained by using a normal charge more. The method commences by selecting an enhanced capacity charge mode at a charging entity used to control charging of the battery. The charging entity may be a charge controller of a portable device such as a mobile communication device, or it may be a stand alone charger. The charging entity commences applying a charge current to the battery. The charge current is held constant or substantially constant. The charging entity monitors a charge voltage of the battery while applying the charge current to the battery. Since the enhanced charging mode is selected, the battery voltage will rise above the normal voltage limit. Upon the charge voltage of the battery passing a normal charge voltage limit and reaching the enhanced capacity voltage level, the charging entity continues to charge the battery at a constant charging voltage level substantially equal to the enhanced capacity charging voltage level. Selecting the enhanced capacity charge may be performed by a user of a portable device, to which the battery is coupled, via a user interface of the portable device. The user interface may be a graphical user interface, providing visual information to the user and accepting input from the user. Alternatively, selecting the enhanced capacity charge may be performed in response to a portable device, to which the battery is coupled, receiving a broadcast command. The broadcast command may be an emergency notification. Where the portable device is a mobile communication device, receiving the emergency notification may be received from a fixed equipment network or base station with which the mobile communication device is wirelessly connected. If the device receives a broadcast command, the device may alert the user of the portable device upon receipt of the broadcast command. The device may record the instance of the charge voltage of the battery passing the normal voltage limit in a memory associated with the battery, which may be used to modify a warranty or warranty condition of the battery.

The invention further provides in an alternative embodiment a portable device system including a portable device and a battery coupled to the portable device. The battery having a battery voltage. Furthermore, the portable device includes a charging entity such as a charge controller disposed in the portable device. The charge controller charges the battery according to either a normal charge regime or an enhanced charge regime. The portable device provides a means for selecting either the normal charge regime or the enhanced charge regime. The normal charge regime comprises charging the battery with a charging current until the battery voltage reaches a normal voltage limit, and then charging the battery at a constant voltage substantially equal to the normal charge voltage level. The enhanced charge regime comprises charging the battery with a charging current until the battery voltage reaches an enhanced voltage limit that is higher than the normal voltage limit, and then charging the battery at a constant voltage substantially equal to the enhanced voltage limit. The battery may be removeably coupled to the portable device and include a writeable memory in which each instance of the battery voltage exceeding the normal voltage limit is recorded. The means for selecting the enhanced mode may be provided via a user interface of the portable device, such as a graphical user interface. Alternatively, the means for selecting the enhanced mode may include a receiver for receiving a broadcast command. The device may therefore include a means for alerting the user of the mobile communication device upon receipt of the broadcast command.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method of charging a battery to provide enhanced capacity, comprising:
   receiving, at a portable device, a wireless control command, from a base station, to use an enhanced capacity charge mode;
   selecting, in response to the receiving, the enhanced capacity charge mode for a battery coupled to the portable device,
   wherein the enhanced capacity charge mode comprises charging the battery with a constant charging current until a battery voltage reaches an enhanced voltage limit that is higher than a normal voltage limit, and then charging the battery at a constant voltage substantially equal to the enhanced voltage limit; and recording when the battery voltage passes the normal voltage limit in a memory associated with the battery.

2. The method of charging the battery as defined in claim 1, wherein the wireless control command comprises an emergency notification.

3. The method of charging the battery as defined in claim 1, wherein the portable device is a mobile communication device, and wherein the wireless control command is received from a fixed equipment network with which the mobile communication device is wirelessly connected.

4. The method of charging the battery as defined in claim 1, further comprising:

alerting a user of the portable device upon receipt of the wireless control command.

5. The method of charging the battery as defined in claim 1, wherein the constant charging current is a substantially constant charging current.

6. The method of charging the battery as defined in claim 1, wherein the recording is used to modify a warranty of the battery.

7. The method of charging the battery as defined in claim 1, wherein the wireless control command includes a broadcast command received from the base station.

8. A portable device system, comprising:

a portable device;

a battery, coupled to the portable device, and having a battery voltage;

a receiver, of the portable device, for receiving a wireless control command including an emergency notification, from a base station, to use at least one of a normal charge regime and an enhanced charge regime; and a charge controller, coupled to the battery, which charges the battery according to either the normal charge regime or the enhanced charge regime based on the received wireless control command;

wherein the normal charge regime comprises charging the battery with a constant charging current until the battery voltage reaches a normal voltage limit and then charging the battery at a constant voltage substantially equal to the normal voltage limit;

wherein the enhanced charge regime comprises charging the battery with a constant charging current until the battery voltage reaches an enhanced voltage limit that is higher than the normal voltage limit, and then charging the battery at a constant voltage substantially equal to the enhanced voltage limit; and wherein the battery includes a writeable memory in which each instance of the battery voltage exceeding the normal voltage limit is recorded.

9. The portable device system as defined in claim 8, wherein the battery is removeably coupled to the portable device.

10. The portable device system of claim 8 further comprising:

a power supply, coupled to the charge controller, for providing constant charging current and voltage to the battery, wherein the battery is a lithium ion battery.

11. The portable device system as defined in claim 10, wherein:

the power supply is external to the portable device and coupled to the portable device.

12. The portable device system as defined in claim 10, wherein the power supply and charge controller are collocated in a stand-alone battery charger.

13. The portable device system as defined in claim 8, wherein the wireless control command includes a broadcast command received from the base station.

* * * * *